April 2, 1968     D. H. CRISS     3,375,553
VALVE DEVICE FOR PLASTIC EXTRUDER
Filed March 11, 1966     2 Sheets-Sheet 2
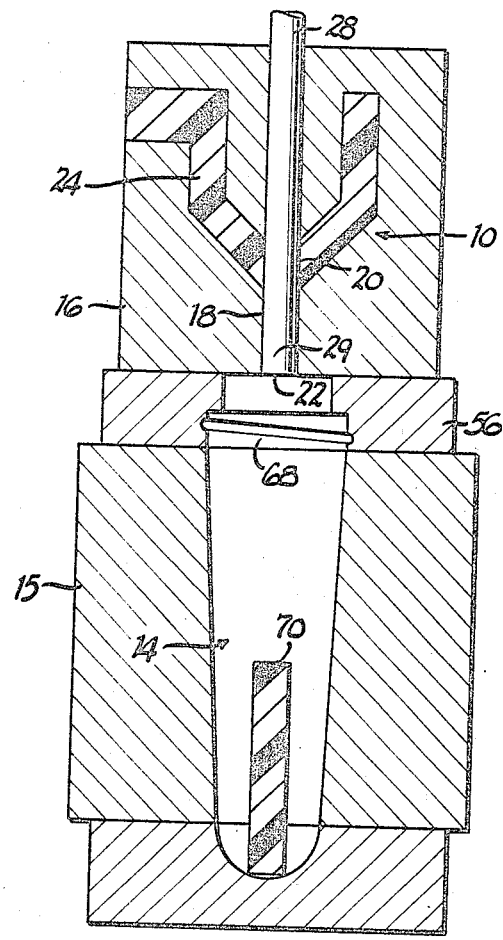
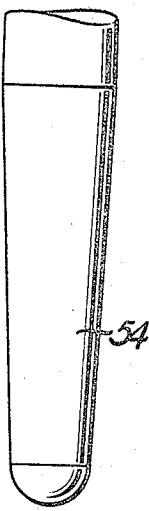
Fig. 2
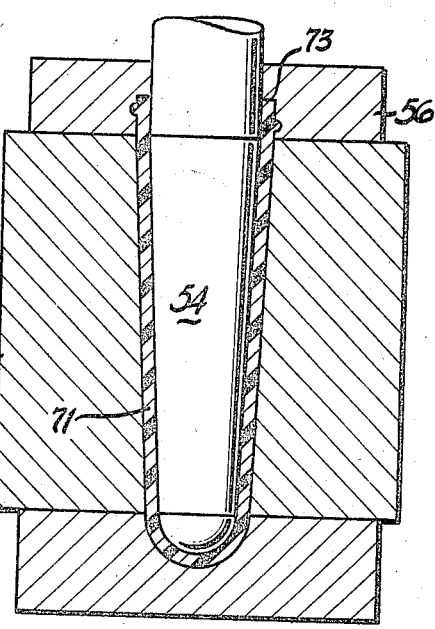
Fig. 3
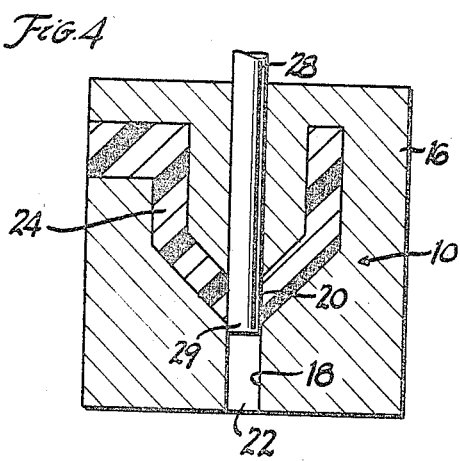
Fig. 4
Inventor.
DONALD H. CRISS
By Philip M. Rice
& W. A. Schaich
ATT'YS.

United States Patent Office 3,375,553
Patented Apr. 2, 1968

3,375,553
VALVE DEVICE FOR PLASTIC EXTRUDER
Donald H. Criss, Toledo, Ohio, assignor to Owens-Illinois, Inc., a corporation of Ohio
Filed Mar. 11, 1966, Ser. No. 533,548
1 Claim. (Cl. 18—30)

This invention relates to the plastic molding art, and more particularly to an apparatus for supplying plasticized material into a mold cavity where it may be formed into an article.

In some plastic molding operations, it is necessary to sever a measured amount of plasticized material from a parent mass, form the severed material into a gob and deliver the gob to a specified place for further processing. Known apparatus for accomplishing these functions have not been entirely satisfactory. For example, if a measured amount of material is sheared off from the parent mass, the shearing action may distort the severed gob or may leave scars in the material at the severed end. If the gob is severed by pinching off a portion of the mass, an irregular surface is left at the pinched region. Such scars and/or iregularities may result in fold lines, voids or other defects in an article formed by compression, blowing or the like from the gob. Additionally, any such severing or pinching from a mass results in chilling a portion of the gob by its contact with the severing or pinching means.

The present invention proposes a novel apparatus for forming a gob of plasticized material utilizing a novel valving, severing and displacing element in combination with a separate and distinct material-pressurizing means. This results in a clean, regular separation of the gob from the parent mass and also allows an end of the gob to be formed to a desired configuration. The separation is accomplished without chilling the material by means of a control system which keeps the valving and severing mechanism from being cooled unduly.

According to the invention, plasticized material is fed through an inlet opening into a valve chamber having an outlet opening leading to a mold cavity. A movable valving member, which may be a rod, is then moved through the chamber past the inlet opening at least into the outlet opening, so as to sever a gob of material from the material in the inlet opening and push the gob completely out of the chamber and the outlet opening into the mold cavity.

The amount of material fed into the cavity is determined entirely separately from the valving function, e.g. by means of a reciprocating and rotational screw extruder which feeds material to the mold cavity via the valve chamber. Only after the amount to be fed to the cavity has been supplied to the valve does the valve deliver that amount to the mold cavity.

The valve body in which the chamber and the movable valving member are provided must remain substantially at the temperature of the plasticized material as it is supplied from the extruder. In this connection, after the movable member has completed a forward stroke to deliver material to the mold cavity, the movable member is retracted to be inside the valve body so that it will not cool below the temperature just referred to. Control circuitry is provided to accomplish this partial retraction of the movable member automatically.

Accordingly, it is an object of the invention to provide an improved apparatus for severing a gob of plasticized material from a parent mass of the material and delivering the gob to a mold cavity.

Another object of the invention is to provide an apparatus wherein a gob of plasticized material is separated from a parent mass by a movable member which moves through a chamber past an inlet opening where the material is severed and into or through an outlet opening in which the member fits, thereby assuring that all material is expelled from the chamber and the outlet opening into the cavity.

Another object of the invention is to keep the movable member of the valve device at the temperature at which the plasticized plastic material is supplied to the valve device.

A further object of the invention is to incorporate in circuitry which controls the movement of the movable member of the valve, control means acting to retract the movable member to an intermediate position in the valve body after it has delivered plasticized material into the mold cavity.

Other objects of this invention will appear in the following description and appended claims, reference being had to the accompanying drawings forming a part of this specification wherein like reference characters designate corresponding parts in the several views.

On the drawings:

FIGURE 2 shows the valve device of FIGURE 1 in a closed condition after a gob of material has been severed and delivered by the valve device to the mold cavity;

FIGURE 3 shows a plunger in the mold cavity inserted into material supplied to the cavity through the valve device of FIGURE 1;

FIGURE 4 shows the valve device of FIGURE 1 after its movable member has been retracted into the body of the device; and FIGURE 5 is a schematic diagram of a control circuit for controlling the extruder and the valve device.

Figure 1:
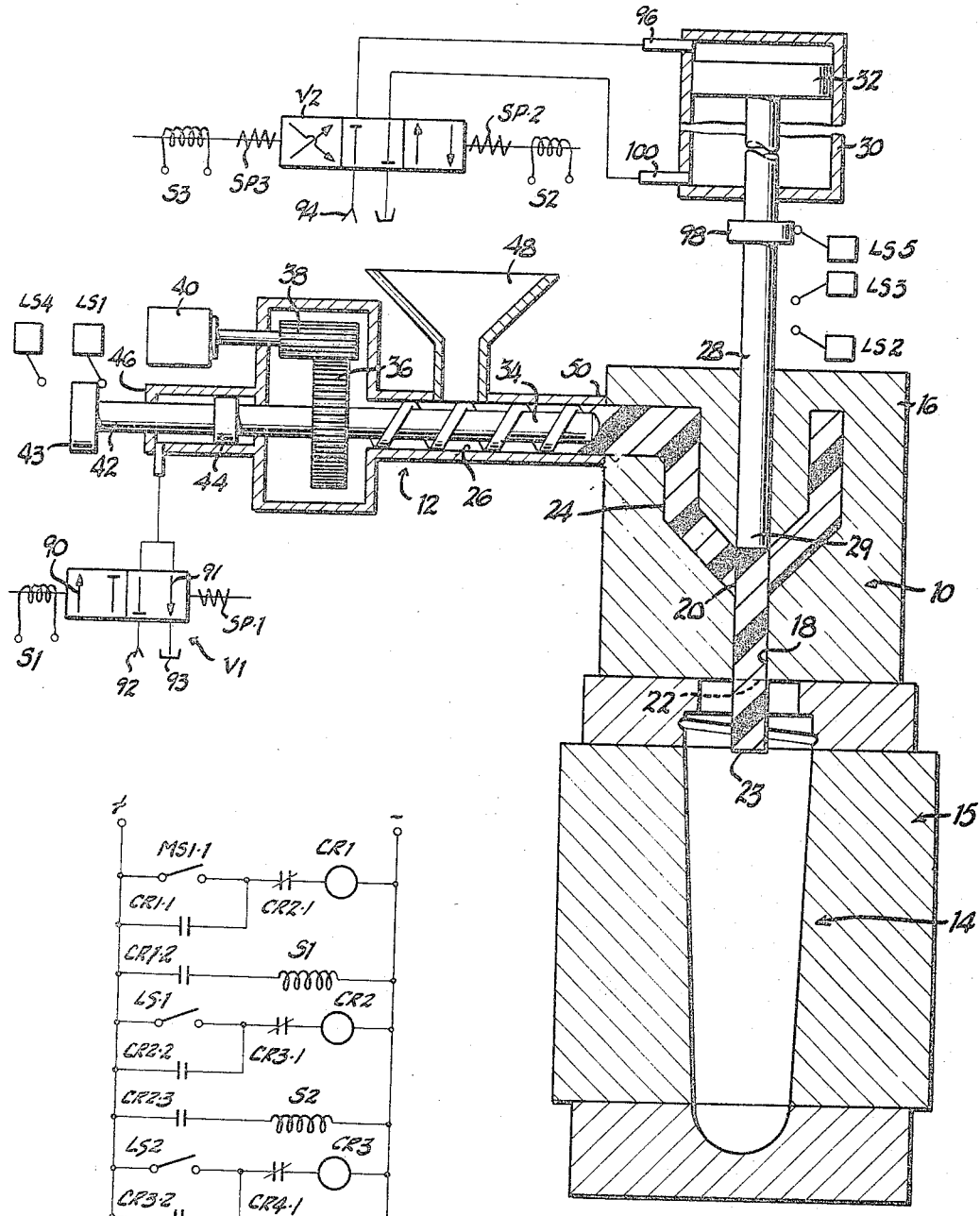
FIGURE 1 is a sectional view of a valve device according to one embodiment of the invention provided for an extruder and a mold cavity, the valve being shown in an open position.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

In FIGURE 1, there is a valve device 10 between an extruder 12 and a mold cavity 14 for controlling the flow of plasticized material from the extruder to the mold cavity. The valve device 10 includes a block 16 having an elongated chamber 18 therein in the form of a longitudinal bore. The bore or chamber 18 has an annular inlet opening 20 at the side thereof and has an outlet opening 22 at one end thereof. The outlet opening 22 leads from the chamber 18 into the mold cavity 14. The inlet opening 20 leads from an annular passageway 24 into the chamber 18, the passageway 24 in turn communicating with the barrel 26 of the extruder 12.

There is a movable rod 28 in the elongated bore which forms the chamber 18. This rod is movable from an open position (FIGURE 1) wherein it is withdrawn from the outlet opening 22 to a point beyond the inlet opening 20 to a closed position (FIGURE 2) where the rod has been moved past the inlet opening 20 into the outlet opening 22. It is evident that when the rod 28 is in its open position, both the inlet opening and outlet opening of chamber 18 are open. Conversely, when the rod is in its closed position as in FIGURE 2, it closes both the outlet opening and the inlet opening to the chamber 18.

One end of the rod 28 extends into a cylinder 30 in which there is a piston 32 connected to the rod 28. The piston may be actuated downward as viewed in FIGURE 1 to push rod 28 through the chamber 18 to its closed position. The piston 32 may subsequently be actuated in the reverse direction to pull rod 28 away from opening 22 to a mid-position as shown in FIGURE 4. This partial retraction of rod 28 serves to keep the rod at the temperature of the incoming plasticized material, since the rod is withdrawn into the mass of the valve body 16 and is not left exposed at the outlet opening. The partial retraction stroke is caused by the control circuit as will be explained later herein. The control circuit ultimately causes the rod 28 to be fully withdrawn to the position shown in FIGURE 1.

The extruder 12 is of the reciprocating and rotational type. It includes a screw 34 provided in barrel 26 and attached at one end to a gear 36 which is driven by a pinion 38 connected to a motor 40. A shaft 42 is affixed at one end to the gear 36 and is also affixed to a piston 44 provided in a cylinder 46. The piston 44 may be actuated to the right to move screw 34 axially to the right as viewed in FIGURE 1 to thereby force a charge of material from the extruder through passageway 24 into the chamber 18 of the valve device.

Granular plastic material is fed to the extruder 12 through a hopper 48 which communicates at its lower end with the interior of the barrel 26. This material is advanced through the barrel by the rotating screw 34 and becomes plasticized before it reaches the end 50 of the barrel. When a charge of plasticized material has accumulated in the barrel 26, the screw 34 may be pushed to the right by actuation of piston 44 as previously explained in order to fill the valve chamber 18 with plasticized material. The other piston 32 is then actuated to push rod 28 through chamber 18 into the outlet opening 22 to thereby sever a gob of plasticized material from the material in the inlet opening 20 of the valve device and deliver this gob of material to the cavity 14 inside the mold 15.

In FIGURE 2, a gob 70 of plasticized material has been expelled from the chamber 18 of the valve device 10, and the gob 70 has fallen freely to the bottom of cavity 14 inside mold 15. The valve device 10 is shown in its closed condition, and the gob 70 is shown in a cylindrical form before it has a chance to conform to the shape of the mold cavity 14. The plunger 54 is outside of the mold at this stage of the processing, but it will be evident that the valve device 10 may be removed from the top of the mold and the plunger 54 may then be moved into alignment with the cavity 14 and inserted in the cavity as shown in FIGURE 3 so as to form a parison 71 by compression molding the gob 70. A finish portion 73 of the parison is formed in the neck mold 56. Although the mold 15 is shown as a parison mold in which a subsequently blown shape is formed, it is understood that other finished or intermediate articles can be made by the techniques of this invention.

A typical sequence of operation will be described beginning with actuation of piston 44 to move the extruder screw 34 to the right as viewed in FIGURE 1. First, a manually actuated or machine actuated switch MS1 (FIGURE 5) is closed to complete an energizing circuit for a relay CR1. The latter relay pulls in and its contacts CR1-1 close to hold it in. Contacts CR1-2 close to energize solenoid S1 which operates a valve V1 associated with cylinder 46. Valve V1 moves to the right to connect passage 90 with fluid source 92 such that fluid flows from the source into cylinder 46 pushing piston 44 to the right, thereby supplying plasticized material into and through chamber 18. In the illustrated embodiment, the amount of material fed to chamber 18 and necessary to form the desired article or parison is more than enough to fill the chamber 18, and the excess material projects down through outlet opening 22 as shown at 23.

Contacts CR1-3 also close to energize another solenoid S3 for a valve V2, and this causes movable member 28 of valve device 10 to move from its intermediate position (FIGURE 4) to its open position (FIGURE 1). This function of solenoid S3 will be described more fully later herein.

When piston 44 has moved fully to the right to the position shown in FIGURE 1, as required to issue the desired amount of material to and through the chamber 18, a collar 43 on shaft 42 actuates a limit switch LS1 which in turn actuates a relay CR2 (FIGURE 5). Contacts CR2-1 of the latter relay open dropping out relay CR1 which in turn opens its contacts CR1-2 and CR1-3 to deenergize the solenoids S1 and S3. Valve V1 then shifts to the left due to the bias of spring SP1 to connect passage 91 to drain 93 so that fluid can flow out of chamber 46 on the return stroke of piston 44.

Meanwhile, contacts CR2-2 close to hold in relay CR2 and contacts CR2-3 close to energize another solenoid S2 for a valve V2 associated with cylinder 30 and piston 32. The solenoid S2 moves valve V2 to the left to thereby connect fluid source 94 to inlet 96 on the upper side of piston 30. Fluid from source 94 can then flow into cylinder 30 above piston 32 to push the piston and movable member 28 downward as viewed in FIGURE 1. As movable member 28 moves through chamber 18, it pushes the material 70 (FIGURE 2) into the mold cavity 14 and continues moving downward until its forward end 29 is in the outlet opening 22 in the position shown in FIGURE 2.

At this stage, a collar 98 on member 28 actuates a limit switch LS2 which energizes a relay CR3 (FIGURE 5). Contacts CR3-1 of the latter relay are in circuit with relay CR2, and these normally closed contacts open to deenergize relay CR2, thus opening contacts CR2-3 to deenergize solenoid S2. The valve V2 is then urged by centering springs SP2 and SP3 back to its centered position where it is ready for actuation to start a return stroke. Contacts CR3-2 of relay CR3 close to hold in this relay and contacts CR3-3 close to energize solenoid S3 for valve V2. This solenoid moves valve V2 to the right to connect fluid source 94 to the inlet 100 of the chamber 30 which is below the piston 32. As fluid flows into this space, piston 32 is forced upward, thus beginning the return stroke of movable member 28.

When the end 29 of member 28 has reached the intermediate position shown in FIGURE 4, the return stroke of piston 32 is halted temporarily to allow the screw extruder 12 to accumulate a fresh charge. The screw 34, gear 36 and shaft 42 all move axially to the left as the charge accumulates at the right end of the barrel 26. During this time, the end 29 of movable member 28 is not exposed to a cooling environment since it is withdrawn into the body of the valve device 10. It is desired to keep all parts of the valve device 10 which contact plasticized material up to the temperature of the material as it leaves the extruder, and the partial withdrawing of the movable member 28 helps to accomplish this while keeping the valve device 10 closed to allow a fresh charge of material to accumulate.

The halting of the return stroke of member 28 happens when the collar 98 actuates limit switch LS3. Relay CR4 then pulls in opening its normally closed contacts CR4-1 to drop out relay CR-3. Contacts CR3-3 then open to deenergize solenoid S3, and valve V2 returns to its neutral position due to the opposing bias of springs SP2 and SP3.

As shaft 42 of extruder 12 moves to the left, it will ultimately actuate a normally closed limt switch LS4. The opening of limit switch LS4 deenergizes the motor 40 which rotates the extruder screw 34, so the extruder stops at this stage with the member 28 still in its intermediate position. At the beginning of the next cycle, switch MS1 is closed to again energize relay CR1, and as previously mentioned, contacts CR1-3 of this relay close to energize solenoid S3. Valve V2 is again pushed to the right to connect fluid source 94 to inlet 100 of chamber 30, thus driving piston 32 upward again. When piston 32 reaches its fully retracted position as shown in FIGURE 1, the collar 98 actuates a normally closed limit switch LS5 to in turn deenergize solenoid S3. This stops the retraction stroke of piston 32 and rod 28.

By comparing FIGURES 1 and 2 it is evident that the rod 28 acts as a piston which moves through the chamber 18 at least into the outlet opening 22 so as to completely expel all plasticized material which initially is in the chamber out of the chamber and into the cavity 14. The gob of material so expelled is severed around its circumference from the material in the inlet opening 20. After the rod 28 reaches its closed position as in FIGURE 2, there is no material remaining in the chamber 18 nor in the outlet opening 22. The cut-off end of the gob is formed by the face 29 of the rod such that the gob of material does not become distorted as it is pushed through the chamber nor are any distorting scars left by the severing action of the rod. The rod may be pushed all the way through the outlet opening into the cavity 14 if desired, but this is not necessary to the invention. Chilling of the rod is prevented by withdrawing it to the intermediate position within valve body 15, and this helps to keep all parts of the valve device up to the temperature of the plasticized material after it leaves the extruder. The valve device does not measure nor determine the amount of material that is fed to the cavity; that function is accomplished entirely separately as by an extruder such that the valve device only delivers to the cavity whatever amount of material is supplied to it.

I claim:

1. In molding apparatus including a mold having a cavity therein and an extruder screw of the rotational and reciprocatory type, a valve device and control means for separating a gob of plasticized material from a parent mass of material supplied from the extruder comprising means forming a chamber having an outlet opening leading therefrom into said mold cavity and an inlet opening leading from said extruder into said chamber, a movable member having (1) a valve-closed position in said outlet opening in which said movable member blocks said inlet opening and is exposed at an end thereof to the ambient temperature in said mold cavity which tends to lower the temperature of said end, (2) a valve-open position away from both of said openings providing an open passage for flow of plasticized material from said extruder into said chamber, and (3) an intermediate position between said valve-open and valve-closed positions wherein said movable member blocks said passage and said end thereof is withdrawn from said mold cavity and is at the temperature of plasticized material as it is supplied to said inlet opening, first actuator means for moving said extruder screw axially to supply a charge of plasticized material to said chamber with said movable member in said valve-open position, said first actuator means including a first piston and cylinder device for moving said extruder screw axially, a first valve controlling said piston and cylinder device and a first solenoid controlling said valve, second actuator means operative to move said movable member from said valve-open position to said valve-closed position to sever a gob of plasticized material from plasticized material in said inlet opening and to force said gob into said cavity, and third actuator means operable to retract said movable member from said valve-closed position to said intermediate position and halt said movable member at said intermediate position, said third actuator means acting in response to actuation of said extruder screw by said first actuator means to deliver a charge of material to said chamber to further retract said movable member from said intermediate position to said valve-open position providing an open passage for feeding said material to said chamber, said second and third actuator means together including a second piston and cylinder device for moving said movable member reciprocally, a second valve controlling said second piston and cylinder device, a second solenoid for actuating said second valve in one sense to cause movement of said movable member from said valve-open position toward said valve-closed position, a third solenoid for actuating said second valve in an opposite sense to cause movement of said movable member from said valve-closed position to said valve-open position, and switching means operative with said third solenoid to halt said movable member temporarily in said intermediate position.

References Cited
UNITED STATES PATENTS

| | | | |
|---|---|---|---|
| 3,231,656 | 1/1966 | Ninneman | 264—329 |
| 3,196,198 | 7/1965 | Rex | 264—329 |
| 3,025,567 | 3/1962 | Sherman | 264—328 |
| 2,834,154 | 5/1958 | Koob | 264—97 |
| 2,890,491 | 6/1959 | Hendry | 264—329 |
| 2,505,540 | 4/1950 | Goldhard | 18—30 |
| 2,944,288 | 7/1960 | Sherman | 264—329 |

FOREIGN PATENTS

| | | |
|---|---|---|
| 10,076 | 8/1962 | Japan. |
| 10,077 | 8/1962 | Japan. |
| 80,070 | 1/1963 | France. |

ROBERT F. WHITE, *Primary Examiner.*

R. B. MOFFITT, A. R. NOE, *Assistant Examiners.*